US009275421B2

(12) United States Patent
Horling et al.

(10) Patent No.: US 9,275,421 B2
(45) Date of Patent: Mar. 1, 2016

(54) TRIGGERING SOCIAL PAGES

(71) Applicant: Google Inc., Mountain View, CA (US)

(72) Inventors: Bryan C. Horling, Sunnyvale, CA (US); David M. Byttow, San Francisco, CA (US); Pavan K. Desikan, Palo Alto, CA (US); Pavani Diwanji, Los Gatos, CA (US); Ronald Ho, Fremont, CA (US); Sagar Kamdar, Redwood City, CA (US); Sara Su, San Jose, CA (US); Vivek P. Gundotra, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/666,909

(22) Filed: Nov. 1, 2012

(65) Prior Publication Data

US 2013/0117301 A1 May 9, 2013

Related U.S. Application Data

(60) Provisional application No. 61/556,140, filed on Nov. 4, 2011.

(51) Int. Cl.
*G06F 17/30* (2006.01)
*G06Q 50/00* (2012.01)

(52) U.S. Cl.
CPC ..................................... *G06Q 50/01* (2013.01)

(58) Field of Classification Search
CPC .............. G06Q 40/00; G06Q 30/0601; G06Q 30/0201; G06F 17/30867; G06F 17/3053
See application file for complete search history.

(56) References Cited

U.S. PATENT DOCUMENTS

| | | | | |
|---|---|---|---|---|
| 2005/0097089 | A1* | 5/2005 | Nielsen et al. | 707/3 |
| 2005/0289141 | A1* | 12/2005 | Baluja | 707/6 |
| 2007/0250486 | A1* | 10/2007 | Liao | G06F 21/6227 |
| 2008/0215553 | A1* | 9/2008 | Badros et al. | 707/3 |
| 2008/0294624 | A1* | 11/2008 | Kanigsberg et al. | 707/5 |
| 2009/0193352 | A1* | 7/2009 | Bunn | 715/780 |
| 2010/0274815 | A1* | 10/2010 | Vanasco | G06F 17/30867 707/798 |
| 2011/0010393 | A1 | 1/2011 | West et al. | |

(Continued)

FOREIGN PATENT DOCUMENTS

| | | |
|---|---|---|
| EP | 0 971 294 | 1/2000 |
| EP | 1 675 025 | 6/2006 |

OTHER PUBLICATIONS

Authorized officer Sung Cheal Byun, International Search Report and Written Opinion in PCT/US2012/063440, mailed Jul. 26, 2013, 10 pages.

(Continued)

*Primary Examiner* — Mariela Reyes
*Assistant Examiner* — Courtney Harmon
(74) *Attorney, Agent, or Firm* — Fish & Richardson P.C.

(57) ABSTRACT

Methods, systems, and apparatus, including computer programs encoded on a computer storage medium, for information retrieval. In one aspect, a method includes receiving a search input including one or more search terms; determining whether the search input includes a particular token; in response to determining that the search input includes the particular token, determining whether the one or more search terms are associated with a particular social page; in response to determining that the one or more search terms are associated with the particular social page, providing the particular social page without providing search results.

14 Claims, 14 Drawing Sheets

(56) References Cited

U.S. PATENT DOCUMENTS

| | | | | |
|---|---|---|---|---|
| 2011/0043652 | A1* | 2/2011 | King et al. | 348/222.1 |
| 2011/0072000 | A1 | 3/2011 | Haas et al. | |
| 2011/0119282 | A1* | 5/2011 | Gorman | G06F 17/30401 707/755 |
| 2011/0173174 | A1 | 7/2011 | Flitcroft | |

OTHER PUBLICATIONS

Authorized officer Athina Nickitas-Etienne, International Preliminary Report on Patentability in PCT/US2012/063440, mailed May 15, 2014, 7 pages.

* cited by examiner

TRIGGERING SOCIAL PAGES

BACKGROUND

This specification relates to information retrieval.

Internet search engines aim to identify resources (e.g., web pages, images, text documents, multimedia context) that are relevant to a user's needs and to present information about the resources in a manner that is most useful to the user. Internet search engines return search results in response to a user submitted query.

SUMMARY

This specification describes technologies relating to information retrieval including triggering social pages.

A user can provide a search input including a token. The token indicates that the user is interested in social pages associated with the search input. If an executed search input including the token is associated with a specific social page, the system provides the social page to the user instead of one or more search results. A user can choose to follow the social page on a social site. The user can choose to follow any future social pages provided through a search input including the token.

For an unexecuted search input including the token, the system can provide one or more social page suggestions. The user can select a particular suggestion and, in response, the system can provide the social page. A preview of search results can be provided for a particular suggestion prior to execution. In some implementations, the social page result are separately presented from the general search results. The social page result can include a preview of content from the social page.

For a search input that does not include the social page, the system can provide one or more suggestions or search results that include one or more social page results and one or more general search results. The social page result can be presented with an associated general search result or according to a ranking order.

In some implementations, only verified social pages are provided as suggestions or provided to users in response to a search input including the token. A social page can be verified using various criteria including the presence of bidirectional links between the social page and a corresponding web page belonging to the same entity.

Determining which social page to provide in a suggestion or provide directly in response to the search input including the token includes identifying dominant queries for the social page or the corresponding web page belonging to the same entity. Determining dominant queries can also take into account geographic regions in which the queries are received. If a received search input including the token matches a social page determined to be dominant for the query, the system can provide the social page as a suggestion or, if the query is executed, provide the social page in response to the search input.

In general, one aspect of the subject matter described in this specification can be embodied in methods that include the following actions. A search input including one or more search terms is received. It is then determined whether the search input includes a particular token. In response to determining that the search input includes the particular token, it is determined whether the one or more search terms are associated with a particular social page. In response to determining that the one or more search terms are associated with the particular social page, the particular social page is provided without providing search results. Other embodiments of this aspect include corresponding systems, apparatus, and computer programs.

These and other aspects can optionally include one or more of the following features. The user can be prompted for input on treatment of future search requests including the particular token. The prompt can include allowing future content automatically for social pages associated with received search requests including the particular token. The user can also be prompted to allow future content from the particular social page. The one or more search terms and the particular token can be provided by a user voice input. The one or more search terms can include an image.

In general, another aspect of the subject matter described in this specification can be embodied in methods that include the following actions. A search input can be received in a search interface, the search input including a particular token and additional text input. Prior to execution of the search input, one or more suggestions are provided, the suggestions including one or more social pages associated with the search input. An input selecting a particular suggestion is then received. The social page associated with the suggestion is then provided. Other embodiments of this aspect include corresponding systems, apparatus, and computer programs.

These and other aspects can optionally include one or more of the following features. Prior to receiving the input selecting a particular suggestion, input navigating to the particular suggestion can be received and a preview representation of the corresponding social page within the search interface can be provided. Prior to receiving the input selecting a particular suggestion, one or more search results in the search interface can be provided, the search results being responsive to a suggested completed search query and including a corresponding social page. The particular token can be a designated text character input.

In general, another aspect of the subject matter described in this specification can be embodied in methods that include the following actions. For a given social page, determining that the social page is a verified social page, determining one or more queries that are dominant for the social page; and providing information associated with the social page for a received search input including a token indicating an interest in social pages wherein the search input is associated with one of the one or more queries. Other embodiments of this aspect include corresponding systems, apparatus, and computer programs.

These and other aspects can optionally include one or more of the following features. Determining that the social page is a verified social page can include determining whether bidirectional links exist between the social page and another resource belonging to the entity. Determining that a particular query is dominant for the social page can include determining that a relative click rate for an entity in response to the query exceeds a threshold. The relative click rate can be based on location.

Particular embodiments of the subject matter described in this specification can be implemented so as to realize one or more of the following advantages. A user can find and follow social pages of interest easily. Social page owners can conveniently let users know how to connect to them socially.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
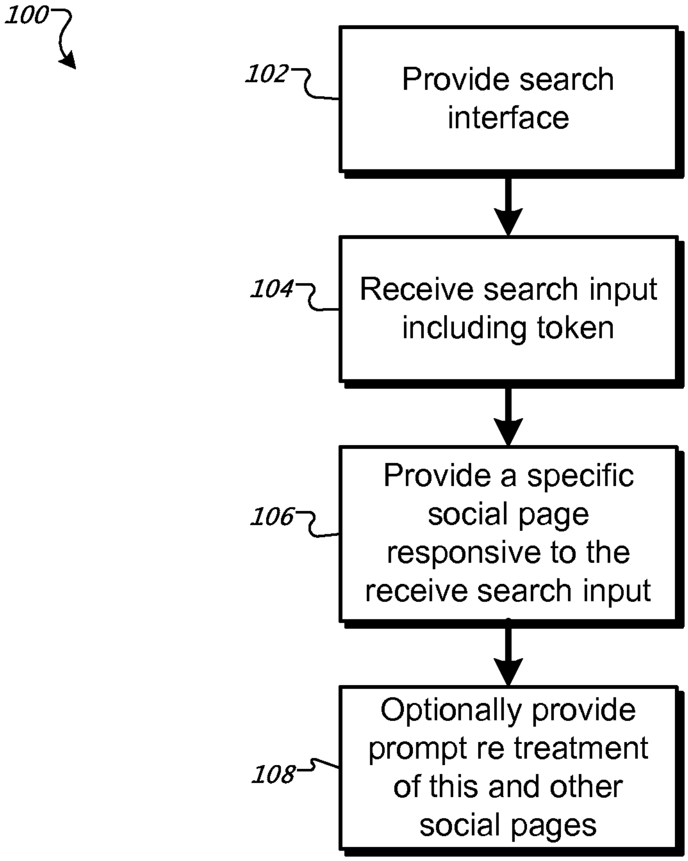
FIG. 1 is flow diagram of an example method for providing a social page.

FIG. 1 is flow diagram of an example method 100 for providing a social page. For convenience, method 100 will be described with respect to a system, having one or more computing devices, that performs the method 100.

The system provides a search interface (102). The search interface can be provided to a client for display to a user with, for example, a browser application. The search interface can include a search field for receiving input. A received search input can be executed, for example, through a particular key stroke (e.g., enter key) or using a user interface element, e.g., a search button.

In some implementations, the search interface is provided as a web page of a search system. In some alternative implementations, the search interface is provided as a search field in a browser toolbar. In some other alternative implementations, the search interface is provided as an address field in a browser. In further implementations, the search interface is provided in a field of another software application such as an address book, a general search utility, or other types of software applications.

The system receives a search input including a token (104). The search input can include text input, e.g., a search query, having one or more terms or can include an image input. Additionally, in some implementations, the user can provide user input to the search interface as a voice input. The voice input can be converted into text using a speech-to-text system. The converted text can be presented within the search field.

The token is a specified input that indicates a particular type of search is to be performed. In some implementations, the token is a specific text character, e.g., a "+" character as the first input to the search field. In some alternative implementations, the token is provided as a voice input, for example, by speaking "plus." The token can be used to trigger a search for a particular type of content. In particular, the "+" token can signal an interest specifically in social pages. In some implementations, social pages are associated with non-person entities, for example, particular companies or organizations. However, in other implementations, the social pages are associated with both non-person and person entities (e.g., individual users). In some implementations, the token can be specified in an address bar or other field besides the search field, or in the user interface of an application besides a web browser.

The one or more terms of search input including the token can identify a particular entity. For example, the search input can identify XYZ Corporation as "+XYZ Corp." This differentiates from a general search of resources responsive to "XYZ Corp." because of the "+" token indicating an interest in social pages associated with "XYZ Corp."

The system provides a specific social page responsive to the received search input (106). In particular, upon execution of the search input, the system determines whether there is a specific existing social page that is associated with the received search input. If there is an existing social page, e.g., a social page for "XYZ Corp." the system can provide the corresponding social page instead of search results, e.g., by redirecting the user browser to the URL corresponding to the social page. The provided social page can be presented to the user, for example, as rendered by the user's browser.

In some implementations, determining whether there is a specific existing social page associated with the received search input includes searching a collection of available social pages for a social page responsive to the search input. The collection of available social pages can be specified according to particular criteria, for example, particular verified social pages. Determining that a particular social page is responsive to the search input can depend on particular criteria, described in greater detail below with respect to FIG. 13.

If no matching social pages are identified, e.g., because a social page does not exist for the received search input, the system can provide search results responsive to the search input. For example, the search results can include similar social pages or social pages that partially match the search input. Alternatively, or additionally, the system provides general search results that are not restricted to social pages and which are responsive to the received search input.

When providing the social page to the user, the system optionally provides a prompt with respect to treatment of the social page and future social pages (108). If the user is a member of a social site associated with the social page, e.g., as a person entity on the social site, the user can be first prompted to log in. If the user is not a member of the social site, the user can be prompted to join.

If the user is already logged in, the prompt can include a choice between two options, a follow option and a no follow option. If selected, the follow option results in the user following the social page from the user's social profile. Thus, the user will receive content on their social page as posted on the followed social page. Additionally, in some implementations, selecting the follow option results in the user following any future social pages provided in response to a search input having the token. For example, at a later time the user can provide a search input "+Car Corp" to a search interface and be directed to a corresponding social page associated with "Car Corp." If the user is signed into the social site, the social page "+Car Corp" is added to their followed entities.

The user can be prompted to specify a particular social group in which to add the social page, for example, when the user does not have a specified social group for following social pages. Additionally, when a user is automatically added to follow a later provided social page, an undo option can be provided to the user.

If the no follow option is selected, the social page will not be followed and the user will be prompted again the next time a social page is provided to the user in response to a search input having the token. In some implementations, an additional selection option allows the user to opt out from future prompts to follow social pages. Opting out from future prompts can be set with a user preference, for example.

Figure 2:
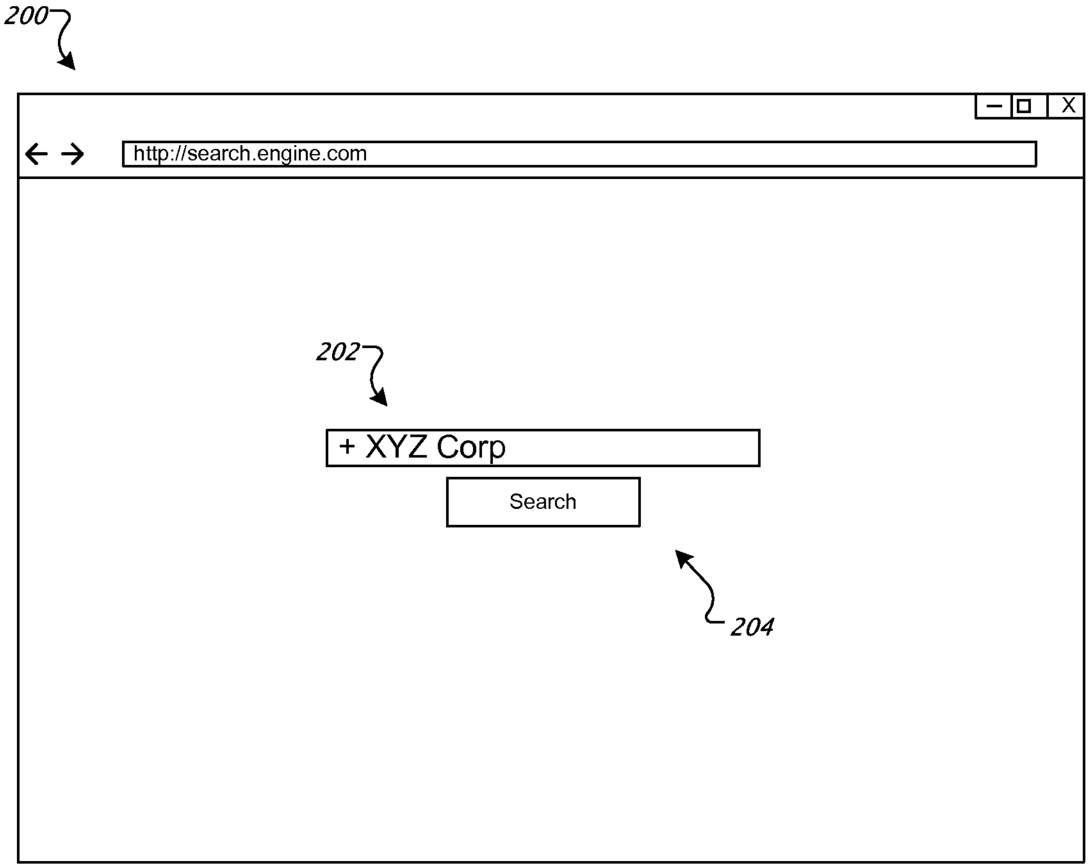
FIG. 2 is an example search interface including a search input having a particular token.

FIG. 2 is an example search interface 200 including a search input having a particular token. In particular, the search interface 200 can be a search interface provided to a user for display in a browser application. The search interface 200 can be associated with a particular search system. The search interface 200 includes a search field 202 and a search button 204. The search field 202 includes an example search input including a token. In particular, the token "+" is followed by search terms "XYZ Corp" indicating a search for social pages associated with XYZ Corp. the user can execute the search based on the search input in the search field 202 by selecting the search button 204 or by a particular keystroke, e.g., pressing an enter key.

Figure 3:
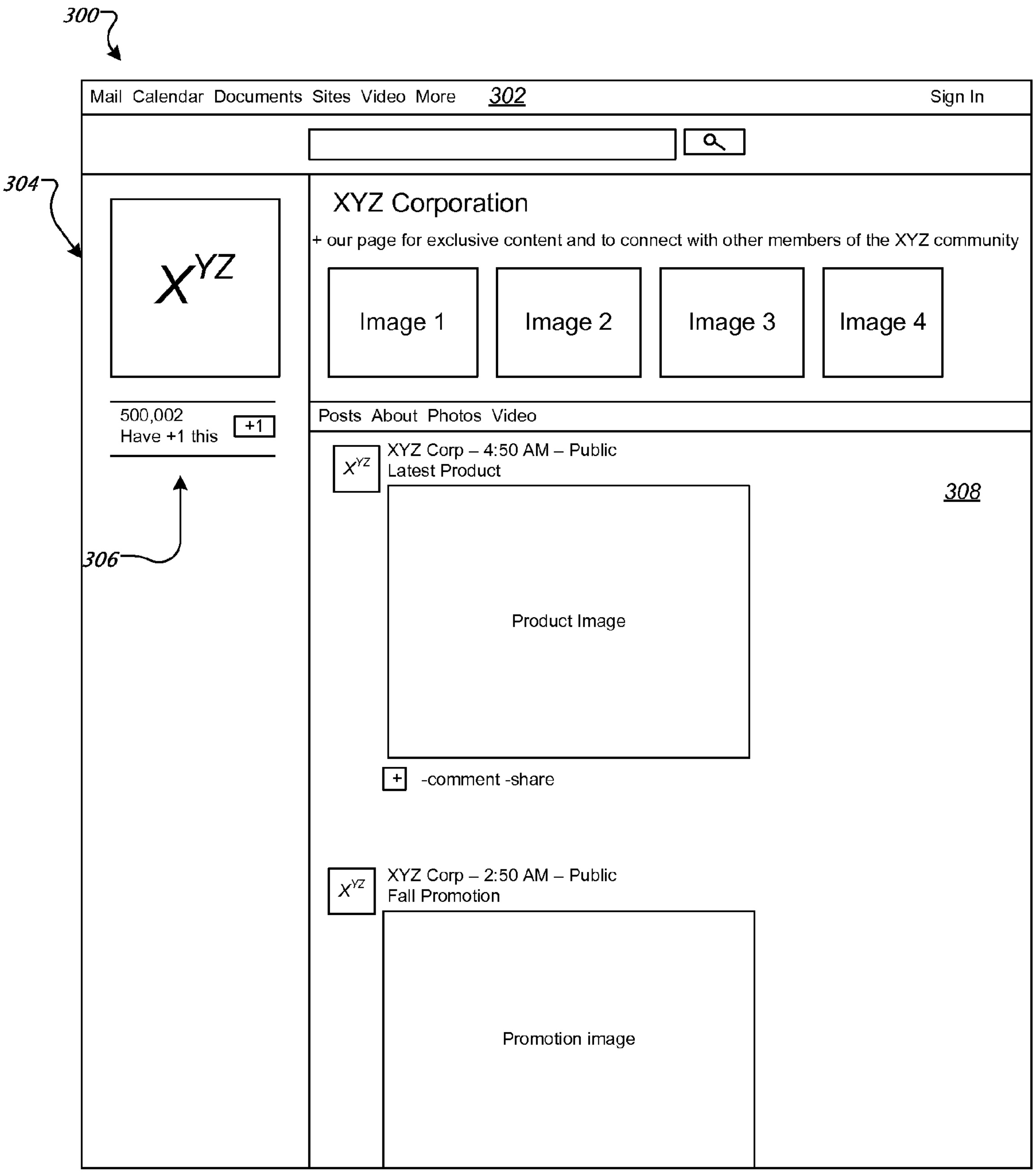
FIG. 3 is an example social page.

FIG. 3 is an example social page 300. The social page 300 can be provided in response to an execution of a search input including a token, for example as shown in FIG. 2. The social page 300 can be part of a social site including a number of social pages both for person entity (e.g., individuals) and non-person entity members.

In particular, the social page 300 for XYZ Corp is illustrated as viewed by an individual user, e.g., in a browser interface, that is not currently signed into the social site. The social page 300 includes a menu bar 302 associated with the user and social content 304 for XYZ Corp. The menu bar 302 can provide elements, e.g., links, for accessing other features associated with the social site. For example, the social site can be associated with other services including, for example, mail, calendaring, documents (e.g., word processing), and video. The menu 302 also includes a menu item for signing into the social site. For example, the user can select "sign in" to be provided with login fields.

The social content 304 can include summary information 306 including an image representing the entity (e.g., a company logo), information on how many people have endorsed the entity (e.g., 500,002 people), the name of the entity as well as some introductory text, and one or more images. The social content 304 also includes a region 308 for providing social posts by the entity, e.g., text, images, video. Others can comments on specific posts or share them with others.

Figure 4:
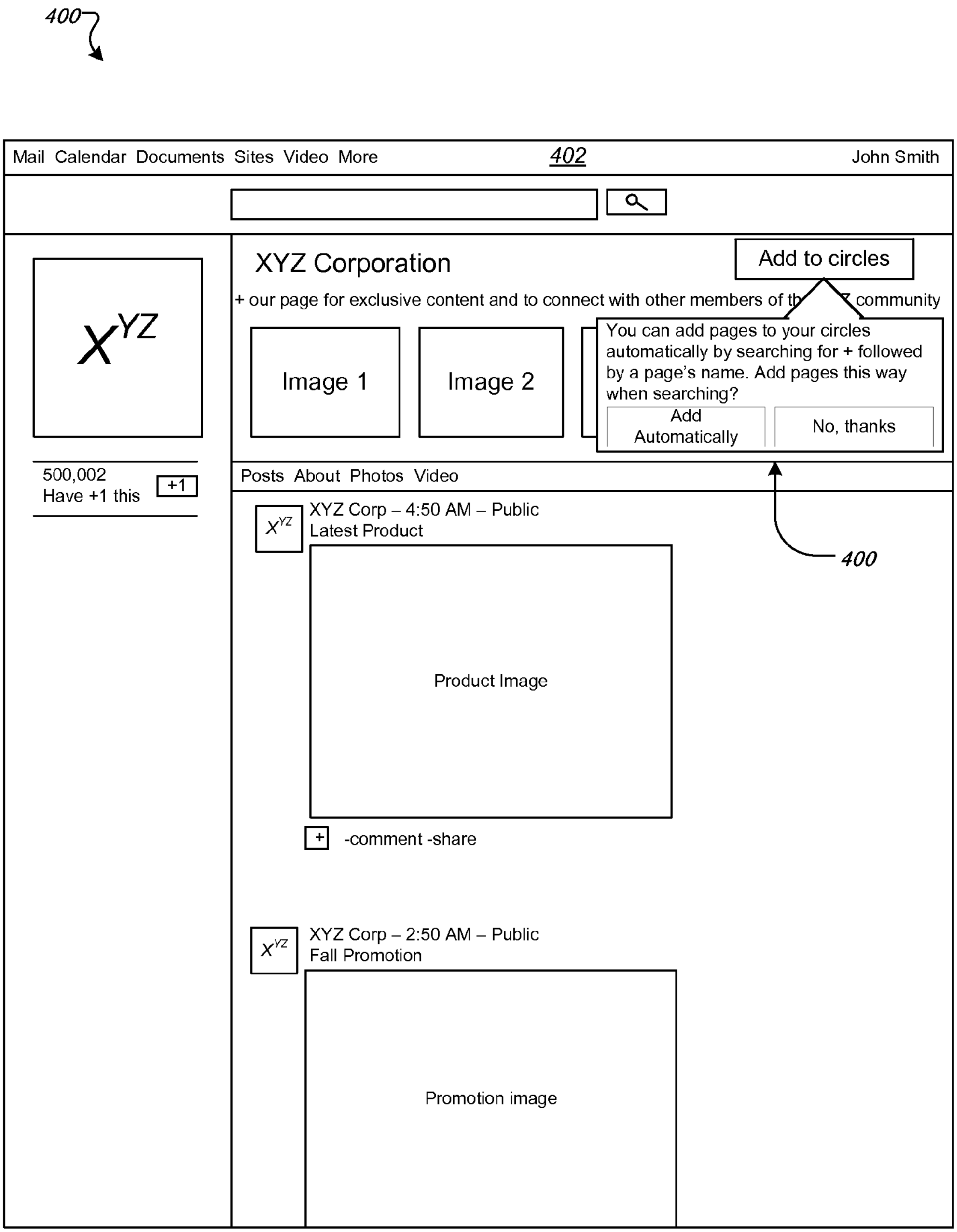
FIG. 4 is an example social page including a follow prompt.

FIG. 4 is an example social page 400 including a follow prompt 404. The social page 400 is similar to the social page 300 of FIG. 3. However, in social page 400, the menu bar 402 indicates that the user, John Smith, is signed in to the social site. Thus, the user is both a member of the social site and is logged in to the social site.

The social page 400 includes the follow prompt 404. The follow prompt 404 indicates to the user that they can chose to both follow the presented social page 400 in a social group as well as automatically follow future presented social pages provided in response to a search input including a particular token, e.g., a "+" search input. Alternatively, the user can choose not to follow the social page 400 or automatically follow future social pages.

In some implementations if user chooses to follow the page the page automatically adds the user into the social graph.

Figure 5:
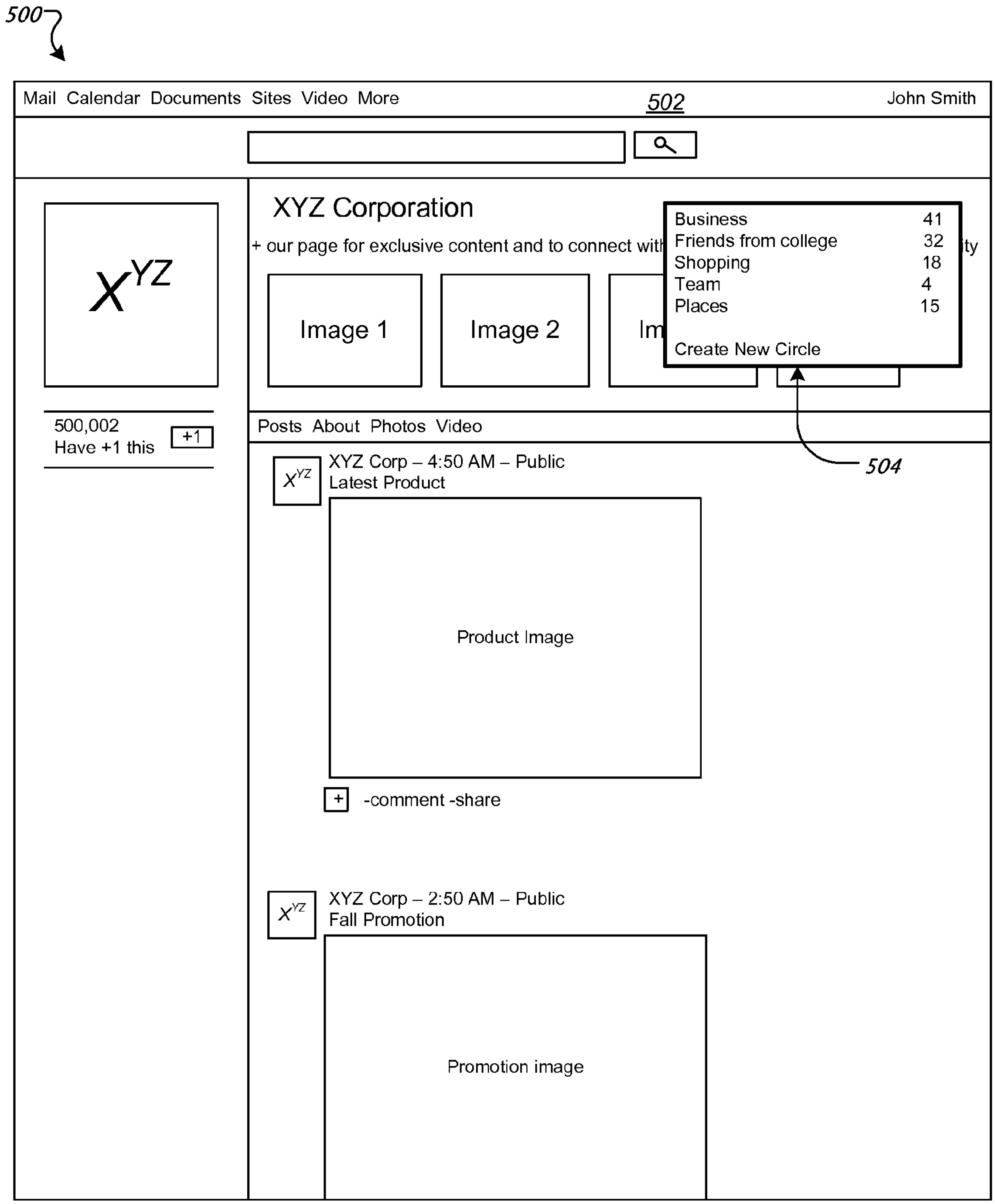
FIG. 5 is another example social page including a group selection prompt.

FIG. 5 is another example social page 500 including a group selection prompt 504. The social page 500 is similar to the social page 400 of FIG. 4. As with the example of social page 400, the user is signed into the social site as indicated by menu bar 502.

In contrast to the example social page 400, a different prompt 504 is provided in social page 500. The prompt 504 lists a number of existing social groups belonging to the user, e.g., "business," "friends from college," and "team." The prompt 504 also includes an option to create a new social group. The user can select a particular one of the existing social groups in which to add the social page 500. The prompt 504 can be provided, for example, if the user does not have a specific "following" social group for following social pages. In some implementations, once a social group is selected all future social pages provided in response to a search input including the token are added to the same social group. In some other implementations, the prompt is provided each time the user is presented with an unassigned social page in response to a search input including the token.

Figure 6:
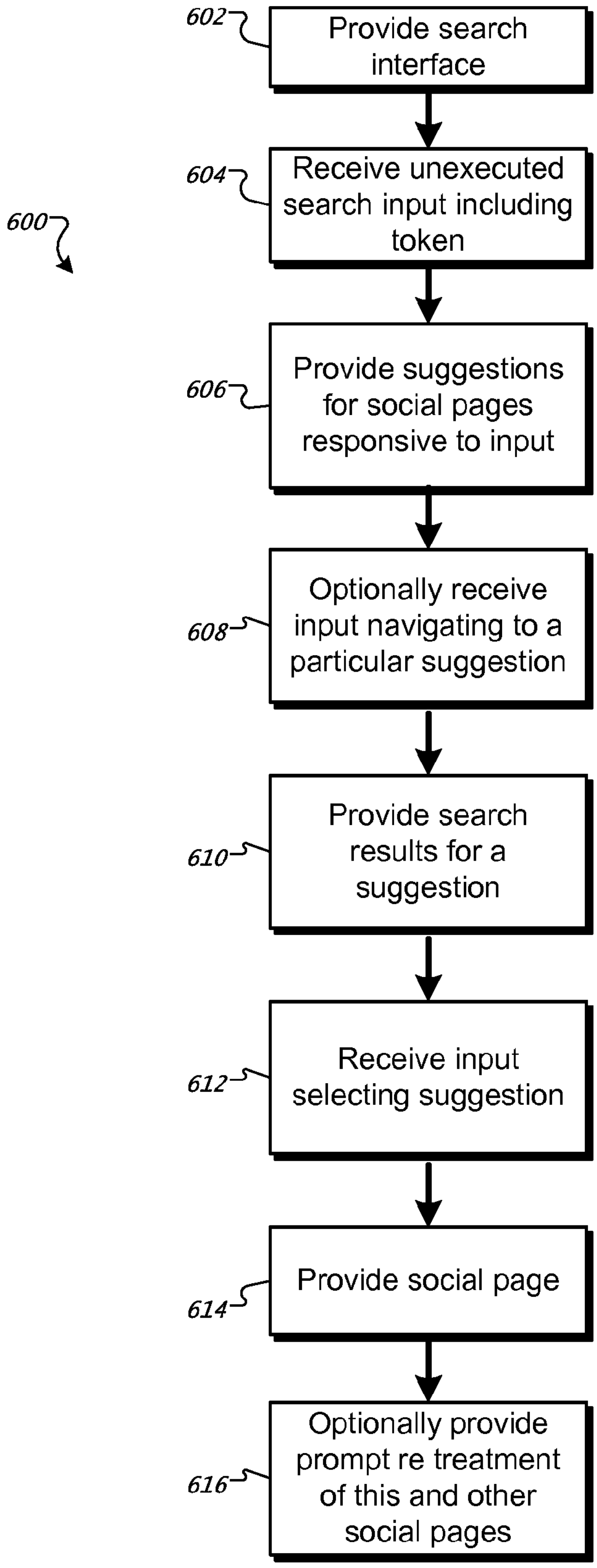
FIG. 6 is a flow diagram of an example method for providing social page suggestions.

FIG. 6 is a flow diagram of an example method 600 for providing social page suggestions. For convenience, method 600 will be described with respect to a system, having one or more computing devices, that performs the method 600.

The system provides a search interface (602). The search interface can be provided to a client user for display using, for example, a browser application. The search interface can include a search field for receiving user input. A received search input can be executed, for example, through a particular key stroke (e.g., enter key) or using a user interface element, e.g., a search button.

In some implementations, the search interface is provided as a web page of a search system. In some alternative implementations, the search interface is provided as a search field in a browser toolbar. In some other alternative implementations, the search interface is provided as an address field in a browser.

The system receives an unexecuted search input including a token (604). The search input is unexecuted because the user has not indicated the search input is complete, for example, by selecting a search button or providing a particular keystroke input (e.g., an enter key) that executes a search.

The user input can include text input of one or more terms or an image input. Additionally, in some implementations, the user can provide user input to the search interface as a voice input. The voice input can be converted into text using a speech-to-text system. The converted text can be presented within the search field.

The token is a specified input that indicates a particular type of search is to be performed. In some implementations, the token is a specific text character, e.g., a "+" character as the first input to the search field. In some alternative implementations, the token is provided as a voice input, for example, by speaking "plus." The token can be used to trigger a search for a particular type of content. In particular, the "+" token can signal an interest specifically in social pages. In some implementations, social pages are associated with non-person entities, for example, particular companies or organizations. However, in other implementations, the social pages are associated with both non-person and person entities (e.g., individual users).

The one or more terms of search input including the token can identify or partially identify one or more entities. For example, the search input can be "+XY," which, as a partial input, matches both "XYZ Corp" and "Xylophone Inc." entities. The use of the "+" token differentiates the search input from a general search of resources responsive to the search input because of the "+" token indicating an interest in social pages associated with the search input.

The system provides one or more suggestions for social pages responsive to the received search input (606). Suggestions can be provided in a drop-down list below the search input field. The suggestions are predictions of complete search inputs based on a number of factors. In some implementations, the suggestions are based on other user's search activities. Additionally, in some implementations, the suggestions can be based on the user's search history. The user can chose to enable or disable using any or particular prior searches in determining suggestions. The suggestion can be algorithmically determined based on objective factors including a popularity of particular search terms without human intervention.

In particular, when the token is included in the search input, the suggestions can be limited to predicted complete search inputs corresponding to entity social pages. In some implementations, suggested query completions for the search input are received and then corresponding social pages of one or more suggested queries are determined. Only the social pages are then presented in the drop down box below the search field. The social pages can be presented in the same order as the underlying query suggestions. For example, a search input of "+XY" can be used to determine social pages "+XY Corp" and "+Xylophone Inc." which are provided as suggested social pages. In further implementations, the social pages can be ordered based on other factors, such as the popularity of the underlying social pages, or the frequency at which a token is used to navigate to the social pages, for example.

The system optionally receives input navigating to a particular suggestion (608). For example, the user can use key input, e.g., arrow keys, to navigate up and down through the provided suggestions. The currently navigated to selection can be highlighted or otherwise visually identified. Additionally, the input in the search field can be modified to correspond to the particular suggestion. In some implementations, the search field is automatically modified to correspond to the first suggestion without user input navigating to the first suggestion.

The system provides search results responsive to a suggestion (610). The suggestion can be a suggested navigated to by the user or can be a default selection, e.g., of the first suggestion. In particular, the system can provide search results for presentation below the drop down box including the suggestions. The provided search results can include both search results identifying one or more social pages and search results identifying general resources responsive to the suggestion, e.g., web pages, images, or video resources. Although search results are provided, the search query has not been executed by the user, thus these preview results are provided within the search interface below the search field and suggestions drop down box.

The system receives input selecting a particular suggestion (612). For example, the user can select enter after navigating to a particular suggestion. The selected suggestion, as described above, corresponds to a particular social page.

The system provides a specific social page responsive to the receive search input (614). In particular, upon execution of the search input, the system provides the social page corresponding to the selected suggestion e.g., by redirecting the user browser to the URL corresponding to the social page. The provided social page can be presented to the user, for example, as rendered by the user's browser.

When providing the social page to the user, the system optionally provides a prompt with respect to treatment of the social page and future social pages (616). For example, the prompt can include a choice between two options, a follow option and a no follow option, as described above with respect to FIGS. 1, 4, and 5.

Figure 7:
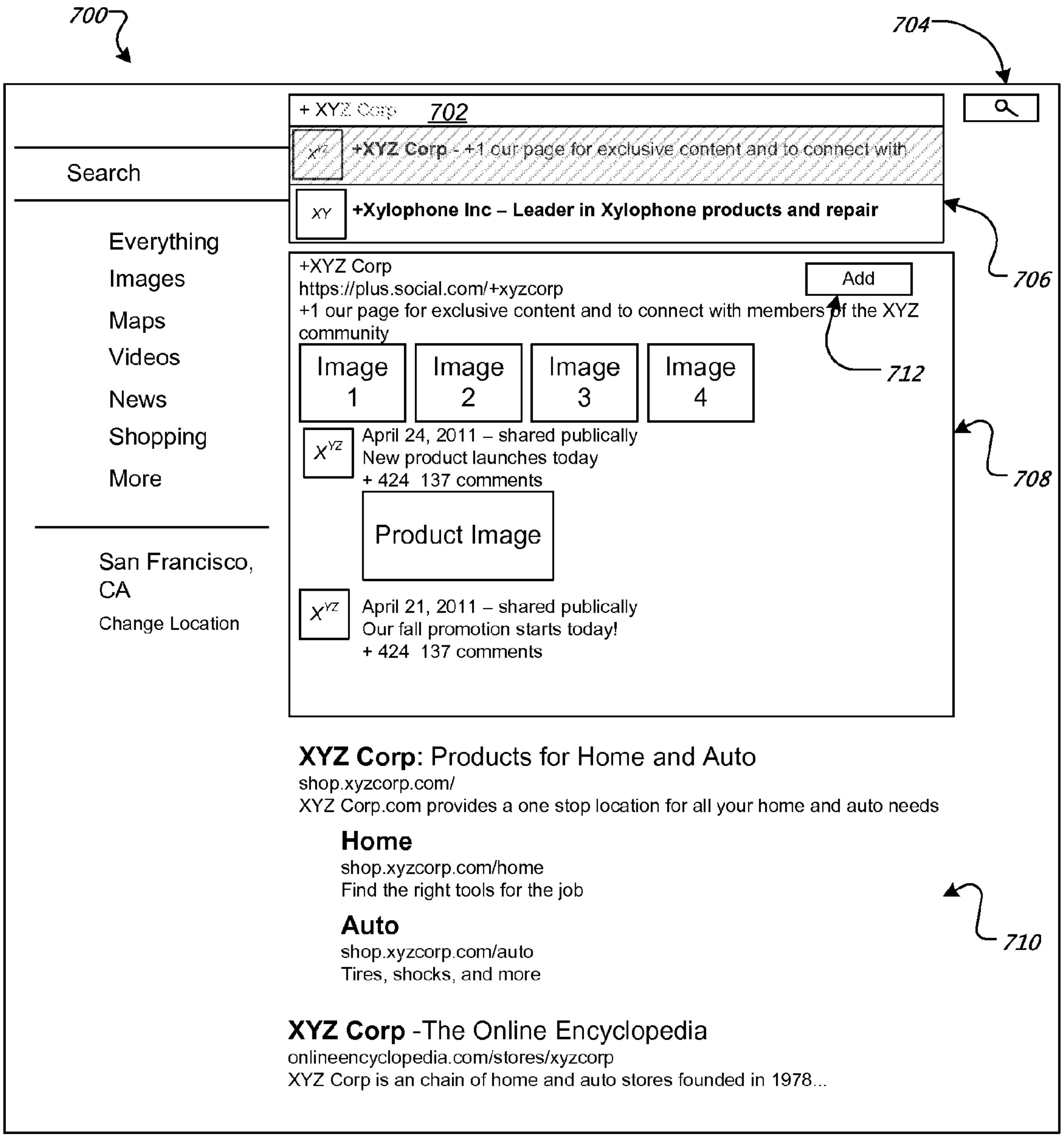
FIG. 7 is an example search interface including suggestions.

FIG. 7 is an example search interface 700 including suggestions. In particular the search interface 700 can be a search interface provided to a user for display in a browser application. The search interface 700 can be associated with a particular search system. The search interface 700 includes a search field 702 and a search button 704. The search field 702 includes an example search input including a token. In particular, the token "+" is followed by search term "XY" as input by the user, indicating a search limited to social pages associated with "XY." The user can execute the search based on the search input in the search field 702 by selecting the search button 704 or using a particular keystroke, e.g., pressing an enter key.

Social page suggestions 706 are presented in a drop down below the search field 702. The social page suggestions 706 are suggested social pages based on the received search input "+XY." In particular, the social page suggestions 706 are suggested social page completions of the search input that identify social pages "+XYZ Corp" and "+Xylophone Inc." In the example shown, the first suggestion "+XYZ Corp" is visually set apart (e.g., by shading or highlighting) from the second suggestion, indicating that it is the currently designated suggestion, for example, by user navigation or as a default because it is the first suggestion. Additionally, the search input in the search field 702 is modified to show a completion using the first suggestion in grayed out text.

Based on the first suggestion being indicated, search results are also presented below the social page suggestions 706. The search results include social page result 708 and general search results 710. The social page result 708 includes preview content from the corresponding social page matching the indicated social page suggestion. As shown in FIG. 7, the social page result 708 includes a description of the social page, images from the social page, as well as posts from the social page (e.g., as a specified number of most recent posts). The social page result 708 is set apart from the general search results 710 using a bounded region. Additionally, the user has an option to directly add the social page to a social group (e.g., to follow the social page) from within the search results using "add" button 712.

The general search results 710 provide search results identifying non-social page resources responsive to the search terms (e.g., the search terms without the "+" token). The general search results 710 are positioned below the social page result 708 and can be ordered according to a particular ranking. The general search results 710 can include links to the corresponding resources (e.g., a URL to a particular web page) as well as snippets of content from the resources.

Figure 8:
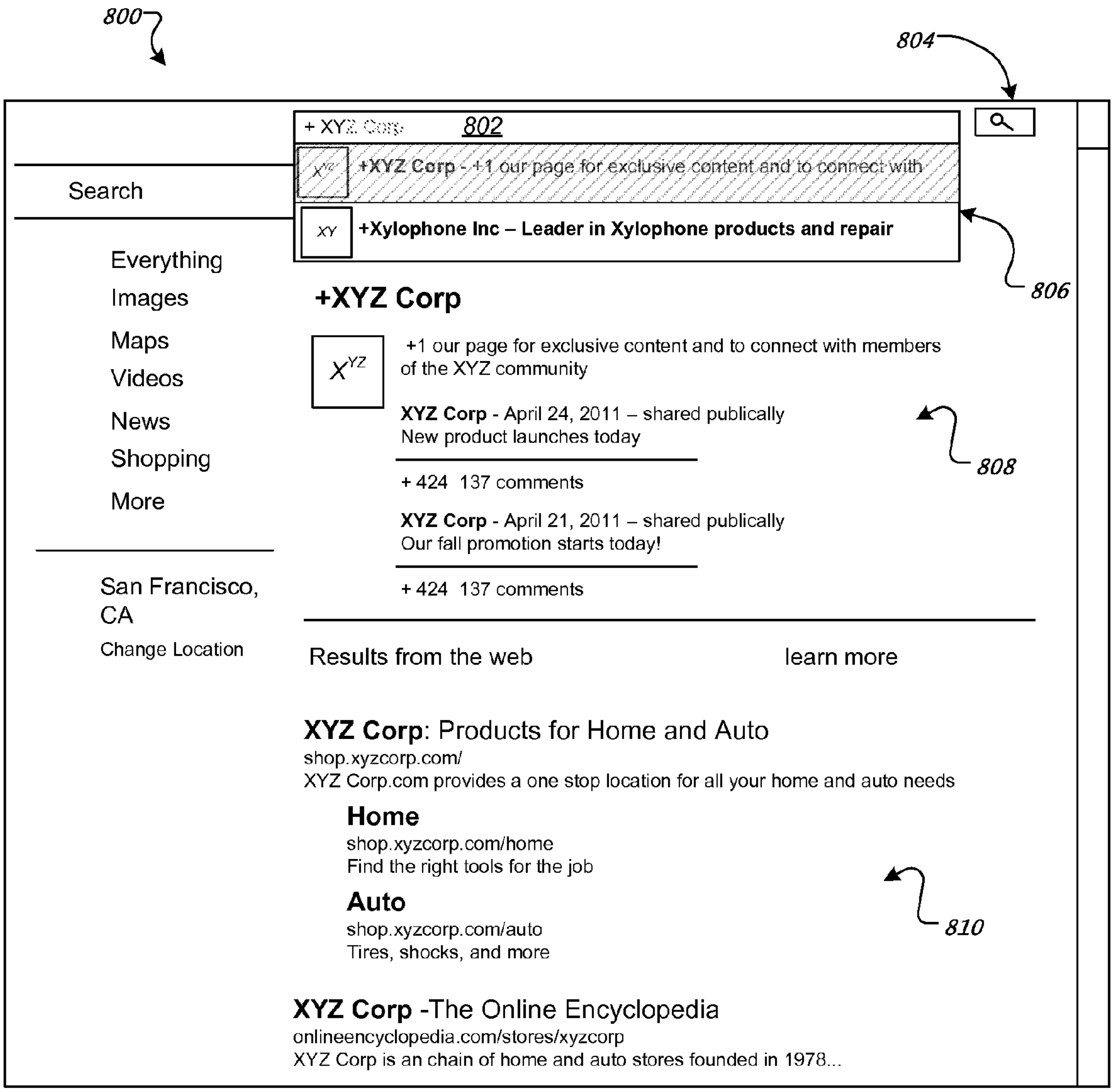
FIG. 8 is another example search interface including suggestions.

FIG. 8 is another example search interface 800 including suggestions. Similar to the search interface 700 of FIG. 7, the search interface 800 includes a search field 802 and a search button 804. The search field 802 includes an example search input including a token. In particular, the token "+" is followed by search term "XY" as input by the user, indicating a search for social pages associated with "XY."

Social page suggestions 806 are presented in a drop down below the search field 802. The social page suggestions 806 are suggested social pages based on the received search input "+XY." Based on the first suggestion being indicated, search results are also presented below the social page suggestions 806. The search results include social page result 808 and general search results 810. The social page result 808 includes preview content from the corresponding social page. The general search results 810 provide search results identifying general search results responsive to the search terms, e.g., the search terms without the "+" token.

In contrast to the search interface 700 of FIG. 7, the search interface 800 distinguishes the social page result 808 from the general search results 810 using a border and a label indicating that the general search results 810 are "results from the web."

Figure 9:
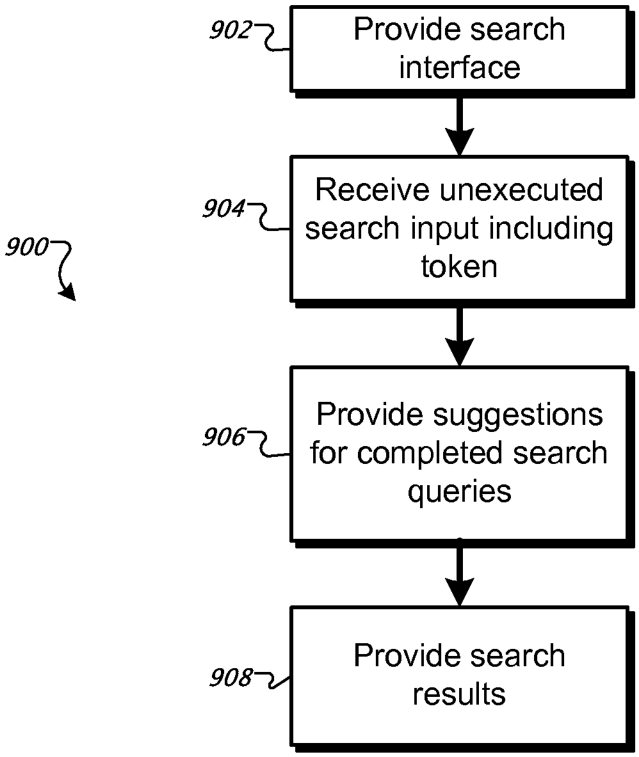
FIG. 9 is a flow diagram of an example method for providing social page results.

FIG. 9 is a flow diagram of an example method 900 for providing social page results. For convenience, method 900 will be described with respect to a system, having one or more computing devices, that performs the method 900.

The system provides a search interface (902). The search interface can be provided to a client user for display using, for example, a browser application. The search interface can include a search field for receiving user input. A received search input can be executed, for example, through a particular key stroke (e.g., enter key) or using a user interface element, e.g., a search button.

The system receives an unexecuted search input including a token (904). The search input is unexecuted because the user has not indicated the search input is complete, for example, by selecting a search button or providing a particular keystroke input (e.g., an enter key) that executes a search.

The user input can include text input of one or more terms or can include an image input. Additionally, in some implementations, the user can provide user input to the search interface as a voice input. The voice input can be converted into text using a speech-to-text system. The converted text can be presented within the search field.

The token is a specified input that indicates a particular type of search is to be performed. In some implementations, the token is a specific text character, e.g., a "+" character as the first input to the search field. In some alternative implementations, the token is provided as a voice input, for example, by speaking "plus." The token can be used to trigger a search for a particular type of content. In particular, the "+" token can signal an interest specifically in social pages.

The system provides one or more suggestions for social pages responsive to the received search input (906). Suggestions can be provided in a drop-down list below the search input field as described above with respect to FIG. 6. In particular, when the token is included in the search input, the suggestions can be limited to predicted complete search inputs corresponding to social pages.

The system provides search results (908). In some implementations, the search results are provided in response to the user selecting a particular suggestion. In some other implementations, the search results are provided in response to the user manually completing and executing a search input. The provided search results include both social page search results and general search results responsive to the executed search input. In some implementations, because of the token, the social page result is presented above the general search results.

Figure 10:
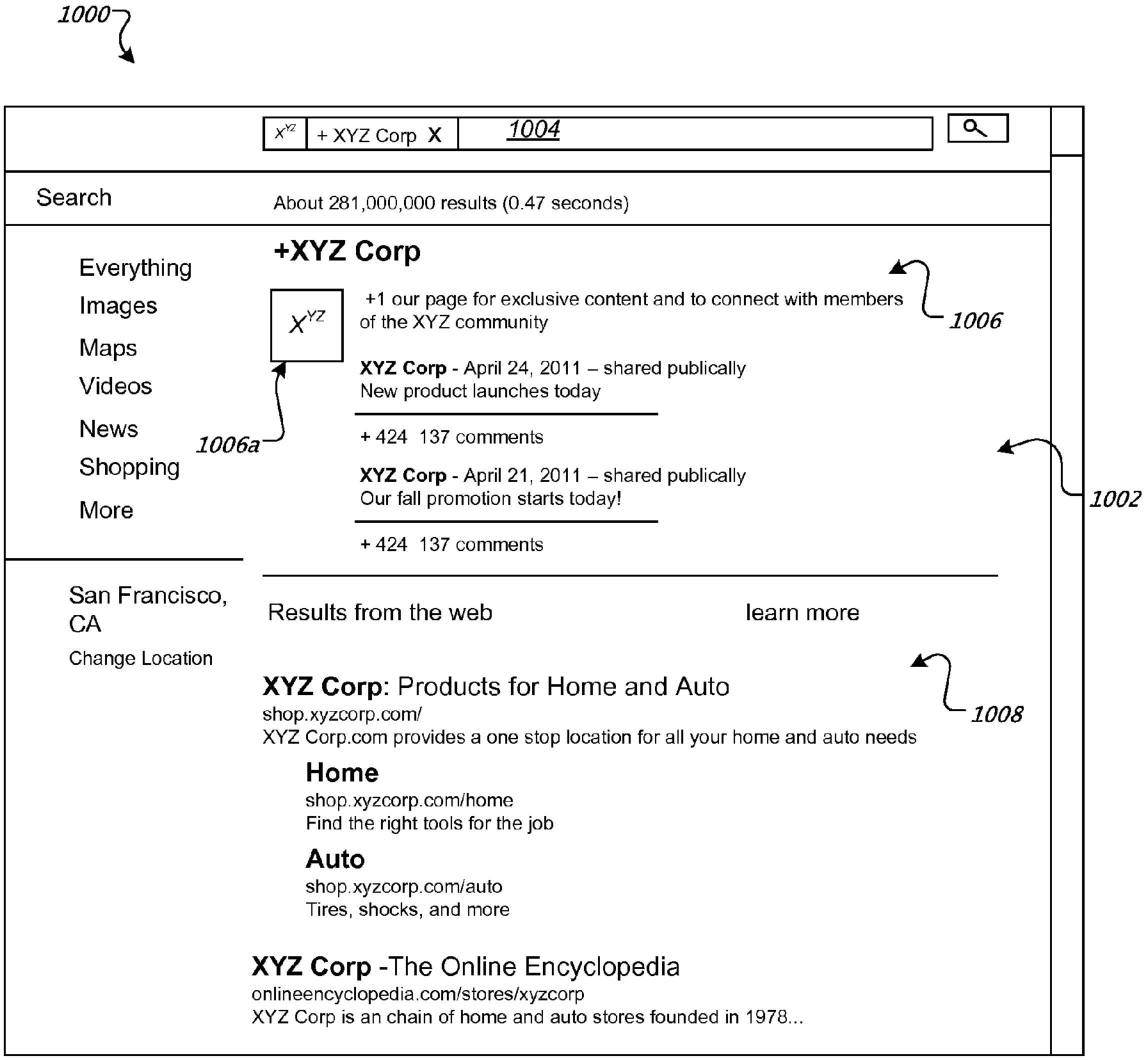
FIG. 10 is an example search interface including a social page result.

FIG. 10 is an example search interface 1000 including a social page result 1006. In particular, the search interface 1000 shows search results 1002 responsive to the search query "+XYZ Corp" as identified in search field 1004.

The search results 1002 includes a social page result 1006 and general search results 1008. In some implementations, the social page result 1006 includes a preview 1006*a* of the social search result webpage. In some implementations, selecting the social page result 1006 causes the system to provide the corresponding social page on a social site. The social page result 1006 can be presented prior to the general search results 1008, regardless of an individual ranking of search results including the social page 1006 because of the use of the token in the search input.

Figure 11:
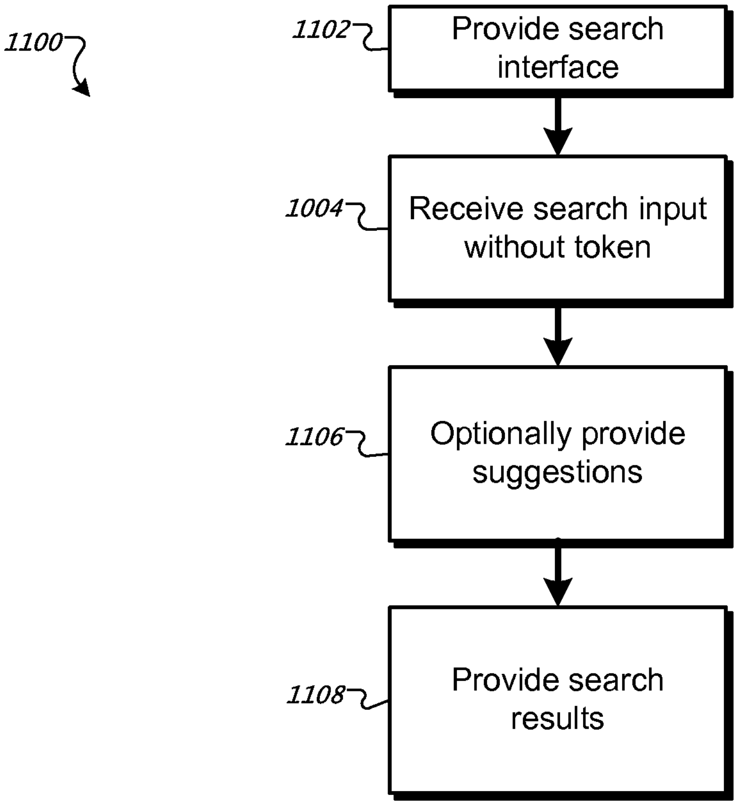
FIG. 11 is a flow diagram of an example method for providing search results.

FIG. 11 is a flow diagram of an example method 1100 for providing search results. For convenience, method 1100 will be described with respect to a system, having one or more computing devices, that performs the method 1100.

The system provides a search interface (1102). The search interface can be provided to a client user for display using, for example, a browser application. The search interface can include a search field for receiving user input. A received search input can be executed, for example, through a particular key stroke (e.g., enter key) or using a user interface element, e.g., a search button.

The system receives an unexecuted search input without a token (1104). The search input is unexecuted because the user has not indicated the search input is complete, for example, by selecting a search button or providing a particular keystroke input (e.g., an enter key) that executes a search. The search input is provided by the user without a token as describe above such that the search input is not identified as one specifically seeking social pages.

The user input can include text input of one or more terms or can include an image input. Additionally, in some implementations, the user can provide user input to the search interface as a voice input. The voice input can be converted into text using a speech-to-text system. The converted text can be presented within the search field.

The system optionally provides suggestions (1106). Suggestions can be provided in a drop-down list below the search input field as described above with respect to FIG. 6. In particular, without the token present in the search input, the suggestions are not limited to social pages. The suggestions are predictions of complete search queries based on a number of factors. In some implementations, the suggestions are based on other user's search activities. Additionally, in some implementations, the suggestions can be based on the user's search history. The user can chose to enable or disable using any or particular prior searches in determining suggestions. The suggestion can be algorithmically determined based on objective factors including a popularity of particular search terms without human intervention.

The system provides search results (1108). In some implementations, a user executes a search based on the search input without being provided with suggestions. In some other implementations in which suggestions are provided, the search can be executed based on a user selection of a particular suggestion.

The provided search results are responsive to the executed search and are ordered according to one or more ranking criteria. While the search results can include a social page result, the social page result is not artificially separated from the other search results. In some other implementations, a social page result is positioned to immediately follow a general search result for a resource associated with the social page. For example, the search result for "+XYZ Corp" can immediately follow the search result for an "XYZ Corp" web page.

Figure 12:
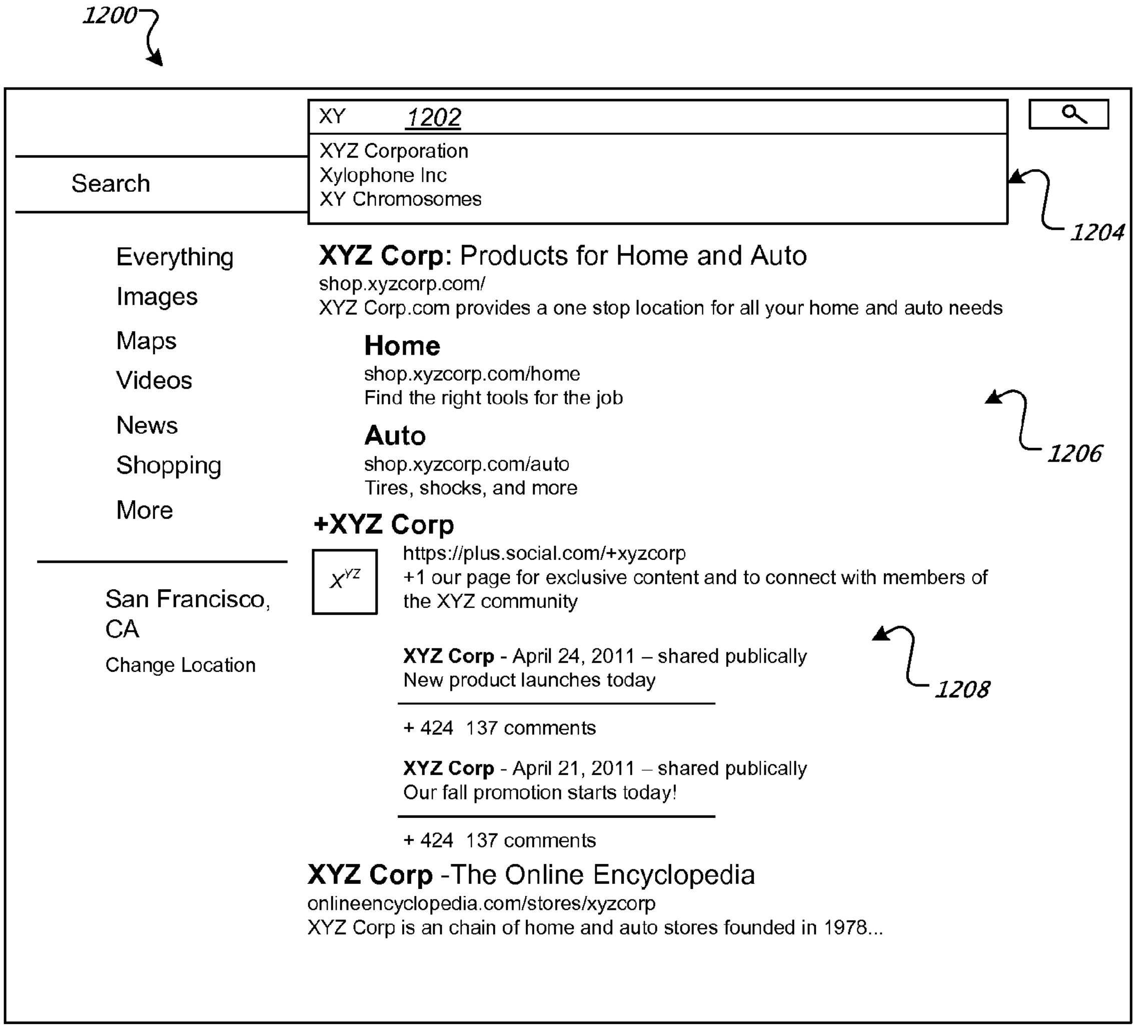
FIG. 12 is an example search interface including a social page result.

FIG. 12 is an example search interface 1200 including a social page result. In particular, the search interface 1200 shows search results 1206 responsive to the search query "XYZ Corp." In particular, suggestions 1204 include the suggestion "XYZ Corp" as the top suggestion, which is then used to determine and provide the search results 1206. The suggestions are completions of the search input "XY" in search field 1202. The search input does not include a token identifying an intended search for social pages. However, social page result 1208 is a result responsive to the query "XYZ Corp" and is provided in the search results 1206. The search results 1206 are ordered according to particular ranking criteria. As a result, the social page result "+XYZ Corp" is not separated from the other search results. The social page result 1208 includes additional social page content including recent posts from the social page.

Figure 13:
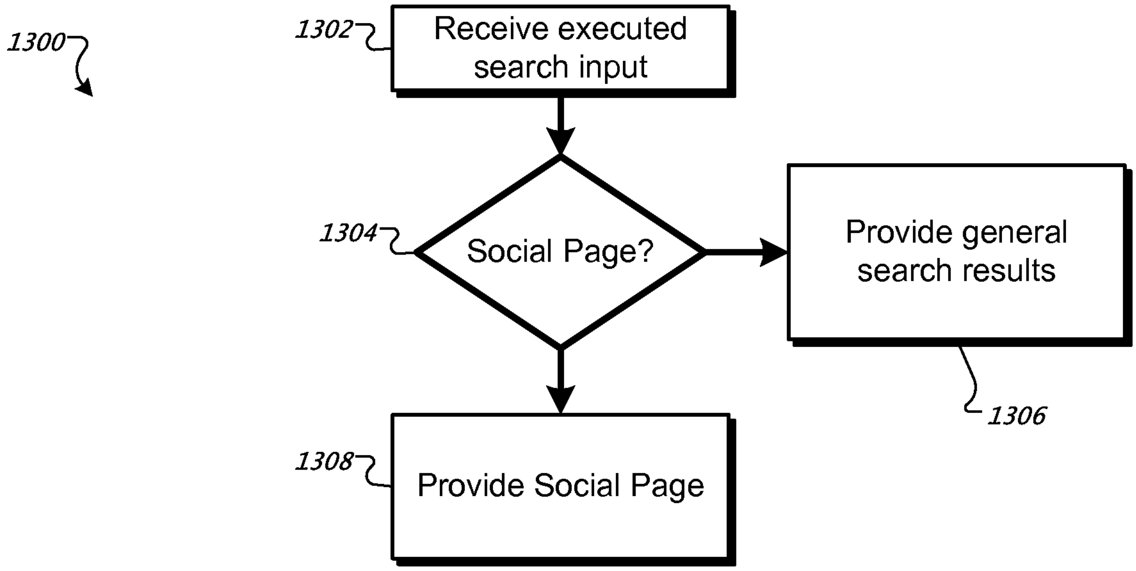
FIG. 13 is a flow diagram of an example method for determining social pages to provide in response to a token.

FIG. 13 is a flow diagram of an example method 1300 for determining social pages to provide in response to a token. For convenience, method 1300 will be described with respect to a system, having one or more computing devices, that performs the method 1300.

The system receives an executed search input including the token (1302). For example, the system can receive one or more search terms following a particular token character, e.g., "+" symbol followed by one or more terms. For example, a user can provide a search input including the token and search terms into a search field of a search interface and execute a search based on the search input. The token is a trigger that indicates social page results are being sought.

The system determines whether there is a social page for the received search input associated with the token trigger (1304). Determining an associated social page can include searching a database or index of previously determined social pages available to provide or a run time process determining whether a social page is available. A given social page is determined to be available to provide in response to a token search input can be based on several factors.

In some implementations, as a threshold factor, the social page is a verified social page. Verifying a social page provides an indication of confidence that the social page actually belongs to the entity. A social page can be verified based on the presence to bidirectional links between the social page and an associated web resource. For example, bidirectional links between a social page for a particular company and the company web page. the bidirectional links can be provided by including rel="me" HTML links on both the social page and the company web page. The bidirectional link provides self-verification of social pages as associated with a particular non-person entity.

Other criteria can be used to verify a given social page. For example, a social page can be verified based on having a threshold number of followers, e.g., other users that have requested to follow the posts of the social page. Thus, if a social page has at least the threshold number of followers (e.g., 500,000), the social page can be deemed a verified social page. In some other implementations, social pages can be manually validated. For example, a human operator can verify (e.g., through communication with the entity) that the social page belongs to the entity. A combination of criteria can also be used. In further implementations, validation of social pages can be accomplished by making the social page owner edit the website for the page, changing a Domain Name System (DNS) entry for the website in a particular way, or verifying the social page with a credit card account and an official listing of the business associated with the social page. Another factor can be the relative ranking of the particular social page. A page that is ranked higher is more likely to be used by the system as the social page corresponding to a given search input. In some implementations, the ranking can be adjusted using one or more of location or language. For example, the ranking of particular search results can be boosted based on matches of location or language of the user.

The navigability of the social page can also be used as a factor. The navigability refers to the confidence that a given search input is directed to a particular entity. The navigability of a particular search input relative to an entity can be determined using statistical evidence. For example, click evidence indicating that, for search results of a given search input, users select the web page (or social page) of a particular entity most often (or a threshold amount more than other search results) can indicate that the search input is dominant for the particular entity. The navigability can use location as a factor, e.g., based on queries and click for particular geographic regions. Thus, for example, a search input can be dominant for a particular entity in the U.S. and the same search input can be dominant for a different entity in Australia.

Furthermore, if a social page for a company has a high degree of uniqueness in the name, a search input including that name is more likely to be dominant for that social page. By contrast, a more generic social page name, e.g., "Chicago Pizza," is less likely to be identified with certainty from a corresponding search input because there may be many different entities that match "Chicago Pizza." In some implementations, the degree to which a given search input points to a specific social page has a threshold level of at least 80%.

Thus, social pages for entities that have unique names are more likely to be associated with particular dominant search inputs. By contrast, social pages for entities having common names, stopwords (e.g., "a" or "the"), or multiple commonly used forms of the entity name, are less likely to be associated with dominant search inputs.

A dominant query for a particular entity can be associated with the entities' social page. Therefore, a particular entity, if verified, can therefore be associated with one or more dominant queries.

If there is no associated social page, general search results can be provided (1306). If there is a matching social page, the system provides the social page to the user (1308). For example, the system can redirect the user browser to a location on a social site corresponding to the social page.

In some implementations, a user's preference for a particular social page can be taken into account in determining which social page to redirect the user to. For example, if two social pages occur in the search results, one being ranked higher than the other, the user can be redirected to the lower ranked social page if the user has shown a preference for that social page. In further implementations, personal cues can be used to associate pages with queries even when the queries would ordinarily be too generic or ambiguous to use. For example if the user's organization is known, "+work" might go to that user's organization's social page. Similarly, tokens such as "+bank", "+john", "+mom" or "+me" could be handled in a similar fashion (e.g., "+pizza" could redirect to the user's favorite pizza restaurant).

Figure 14:
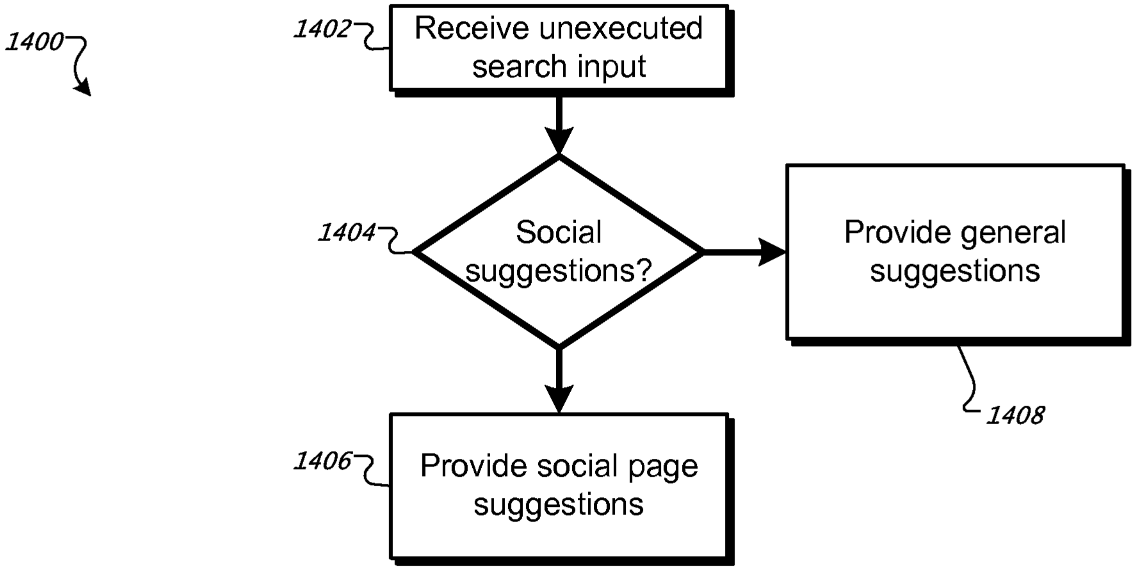
FIG. 14 is a flow diagram of an example method for determining social page suggestions.

FIG. 14 is a flow diagram of an example method 1400 for determining social page suggestions. For convenience, method 1400 will be described with respect to a system, having one or more computing devices, that performs the method 1400.

The system receives an unexecuted search input including the token (1402). For example, the system can receive one or more search terms following a particular token character, e.g., "+" symbol followed by one or more terms. For example, a user can provide a search input including the token and search terms into a search field of a search interface and execute a search based on the search input. The token is a trigger that indicates social page results are being sought.

The system determines whether or not there are one or more social pages to be provided as suggestions for the unexecuted search input (1404). The system can receive one or more suggested queries based on the received input. For example, the received search input can be a partial query and the suggested queries can be completed queries as described above with respect to FIG. 6. The system then determines whether the suggestions are associated with an available social page, for example, based on whether the suggested queries are considered dominant to verified social pages, as described above with respect to FIG. 13.

If there are one or more social pages to be provided as suggestions, the system provides suggestions for the one or more social pages (1406). If there are not one or more social pages to be provided as suggestions, the system provides one or more suggested queries based on the search input terms (1408).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

receiving, at a search service configured to provide both general search results and social search results for a collection of available social pages hosted by a social site, a search input including one or more search terms;

determining that the search input includes a particular token in addition to the one or more search terms, the particular token including one or more particular text characters adjacent to the one or more search terms in the search input, the particular token being a trigger to the search service to search for social pages associated with the one or more search terms;

identifying a particular social page hosted by the social site and responsive to the search input, including:

determining that the one or more search terms identify a particular entity;

searching a collection of available social pages hosted by the social site for both social pages responsive to the search input and for social pages that are associated with the particular entity; and as a result of searching the collection of available social pages, identifying the particular social page, including determining that the particular entity is associated with the particular social page hosted by the social site and that the particular social page is a verified social page verified to be associated with the particular entity on the social site by the particular entity; and in response to determining that the search input includes the particular token adjacent to the one or more search terms and determining that the particular entity is associated with the particular social page, providing a search result resource referencing the particular social page without providing general search results responsive to the one or more search terms.

2. The method of claim 1, further comprising:

prompting the user for input on treatment of future search requests including the particular token.

3. The method of claim 2, wherein the prompt includes allowing future content automatically for social pages associated with received search requests including the particular token.

4. The method of claim 1, further comprising:

prompting the user to allow future content from the particular social page.

5. The method of claim 1, wherein the one or more search terms and the particular token are provided by a user voice input.

6. The method of claim 1, wherein the one or more search terms include an image.

7. The method of claim 1, wherein determining that the particular social page is a verified social page verified to be associated with the particular entity on the social site includes determining whether bidirectional links exist between the social page and another resource belonging to the entity.

8. A system comprising:

one or more computers configured to perform operations comprising:

receiving, at a search service configured to provide both general search results and social search results for a collection of available social pages hosted by a social site, a search input including one or more search terms;

determining that the search input includes a particular token in addition to the one or more search terms, the particular token including one or more particular text characters adjacent to the one or more search terms in the search input, the particular token being a trigger to the search service to search for social pages associated with the one or more search terms;

identifying a particular social page hosted by the social site and responsive to the search input, including:

determining that the one or more search terms identify a particular entity;

searching a collection of available social pages hosted by the social site for both social pages responsive to the search input and for social pages that are associated with the particular entity; and as a result of searching the collection of available social pages, identifying the particular social page, including determining that the particular entity is associated with the particular social page hosted by the social site and that the particular social page is a verified social page verified to be associated with the particular entity on the social site by the particular entity; and in response to determining that the search input includes the particular token adjacent to the one or more search terms and determining that the particular entity is associated with the particular social page, providing a search result resource referencing the particular social page without providing general search results responsive to the one or more search terms.

9. The system of claim 8, further configured to perform operations comprising:

prompting the user for input on treatment of future search requests including the particular token.

10. The system of claim 9, wherein the prompt includes allowing future content automatically for social pages associated with received search requests including the particular token.

11. The system of claim 8, further configured to perform operations comprising:

prompting the user to allow future content from the particular social page.

12. The system of claim 8, wherein the one or more search terms and the particular token are provided by a user voice input.

13. The system of claim 8, wherein the one or more search terms include an image.

14. The system of claim 8, wherein determining that the particular social page is a verified social page verified to be associated with the particular entity on the social site includes determining whether bidirectional links exist between the social page and another resource belonging to the entity.

* * * * *